United States Patent [19]

Ball et al.

[11] 4,094,959
[45] June 13, 1978

[54] PROCESS MEASUREMENT AND CONTROL

[75] Inventors: Donald H. Ball; Robert W. Rutledge; James D. Voelkers, all of Bartlesville, Okla.

[73] Assignee: Phillips Petroleum Company, Bartlesville, Okla.

[21] Appl. No.: 764,926

[22] Filed: Feb. 2, 1977

[51] Int. Cl.² ............... C01C 1/04; G06F 15/18; G06F 15/46; G06G 7/58

[52] U.S. Cl. .................. 423/359; 23/230 A; 23/232 E; 23/253 A; 23/255 E; 364/105; 364/111; 423/362; 364/500

[58] Field of Search ............ 23/232 E, 255 E, 230 A, 23/253 A; 423/359, 360–362; 235/150.1 US, 151.12 MI

[56] References Cited

U.S. PATENT DOCUMENTS

| 3,220,998 | 11/1965 | Berger | 23/230 A UX |
|---|---|---|---|
| 3,471,582 | 10/1969 | Lupfer | 23/230 A X |
| 3,676,066 | 7/1972 | Pennington | 423/359 |
| 4,021,201 | 5/1977 | Vantrain et al. | 23/253 A |
| 4,025,498 | 5/1977 | Buss et al. | 23/230 A X |

Primary Examiner—Joseph Scovronek

[57] ABSTRACT

In the measurement of a variable process parameter and control of the process in response thereto, a transform of a process parameter measurement signal that can be described as the time derivative of a second order or higher lagged process parameter measurement signal is utilized to provide predictive capability. This transform is combined with the output of a PI controller to the input of which the process parameter measurement signal has been fed, thereby generating a process variable signal that either directly or after passing through another controller is utilized as a process control signal for controlling the process in response to the measured parameter. The system is particularly well adapted to control of a non-self-regulating process.

23 Claims, 7 Drawing Figures

PROCESS MEASUREMENT AND CONTROL

This invention relates to an apparatus and method for generating a process variable signal in response to a measured process parameter. In another aspect the invention relates to an apparatus and method for generating a process control signal. In yet another aspect the invention relates to an apparatus and method for controlling a process. In still another aspect the invention relates to an apparatus and method for controlling an ammonia synthesis reaction. In another aspect the invention relates to an apparatus and method for incorporating effective derivative or predictive action into a process control system responding to an incrementally altered process measurement signal. In yet another aspect the invention relates to an apparatus and method for controlling a non-self-regulating process.

In the control of various processes, particularly processes comprising one or more chemical reactions, automatic regulation and control of the process must be based on information obtained directly or indirectly from observing or measuring process parameters which are capable of characterizing the process and providing useful information upon which a sound control strategy can be based. Many reaction characteristics such as temperatures, pressures, flow rates, and the like can be measured continuously and substantially instantaneously. Other measurements can be realized only after the passage of some required period of time such as the time necessary to elute a sample of material through a chromatographic separation column and to determine the relative proportions of preselected constituents within the sample, for example. Among the variety of process measurements which can be used to characterize any particular reaction, some measurements or combinations of measurements may be used under appropriate conditions to generate predictive signals containing information which, based on the known process characteristics and other similar relevant circumstances, will permit the exercise of process control taking into consideration process trends as well as current process operating conditions. While it is advantageous to provide predictive information based on process measurements which are substantially instantaneous and continuous, it is also important to be able to use measurements which are realized only after a time delay as the basis for the generation of predictive signals containing process trend information. The ability to generate a signal representative of a process trend based on such as delayed measurement is, in fact, particularly important since some predictive information must be taken into account in order to provide control signal information which is abreast of current process conditions, and even additional predictive information must be provided if actual predictive control based on the delayed measurement is to be exercised.

A control system incorporating the generation of a predictive factor in conjunction with the measurement of process conditions and/or control of the process in response to measurement of such conditions can be advantageous in many processes. A predictive response to process parameter measurements is particularly important and needed, however, in the control of a process which is non-self-regulating. In this sense, a self-regulating process can be defined as a process which, in response to a specified alteration of some process parameter, will exhibit a change from one stable, steady-state operating condition to a new stable, steady-state operating condition. A non-self-regulating process, on the other hand, is one in which modification of a process parameter will result in an unstable condition wherein the change initiated by the alteration of a process parameter will continue to take place unless additional suitable control action is exercised to alter the process operation.

Accordingly, an object of the invention is to provide an apparatus and method for generating a process variable signal in response to a measured process parameter. Another object of the invention is to provide an apparatus and method for generating a process control signal. Yet another object of the invention is to provide an apparatus and method for controlling a process. Still another object of the invention is to provide an apparatus and method for controlling an ammonia synthesis reaction. Another object of the invention is to provide an apparatus and method for incorporating effective derivative or predictive action into a process control system responding to an incrementally altered process measurement signal. Yet another object of the invention is to provide an apparatus and method for controlling a non-self-regulating process. A still further object of this invention is to provide an apparatus and method for controlling a process wherein process parameter measuring means can be serviced or replaced without having to shut down the process or the entire control.

In accordance with the invention, a process parameter measurement signal is modified to produce a process variable signal incorporating predictive information. Such modification is accomplished by generating a transformed signal from the process parameter measurement signal that can be described as obtained by applying a second or higher order lag factor to the process parameter measurement signal to produce a lagged process measurement signal and then generating a signal which is the time derivative of the lagged signal to produce a said transformed signal and combining the transformed signal and an intermediate control signal which in turn is obtained by passing the original process parameter measurement signal through a controller to produce a process variable signal incorporating predictive or process trend information. The transformed signal is herein sometimes also referred to as a predictive parameter signal.

The preferred controller through which the process parameter measurement signal is passed generates an output signal responsive to the process parameter signal which is related to the time integral of the difference between the process parameter measurement signal and a process parameter setpoint signal. Most preferably the controller is a proportional-integral, PI, controller generating said intermediate control signal as the weighted sum of said difference and the time integral over said difference.

In a mathematical equation the control behavior of the PI controller can be expressed by $$IC_1 = k_{11}(MP_1 - SP_1) + k_{21} \int (MP_1 - SP_1)dt + k_{31}(d/dt)(MP_1 - SP_1)$$

wherein
  $MP_1$ is said process parameter measurement signal,
  $SP_1$ is process parameter setpoint,
  $IC_1$ is said intermediate control signal,
  $k_{11}$, $k_{21}$ are constants not equal to zero,
  $k_{31}$ is a constant which in the preferred embodiment of a PI controller is zero.

The combination of the transformed signal and the intermediate control signal is preferably a linear combination, in other words either the weighted sum or the weighted difference of these two signals. The process variable can be related to these two signals by the mathematical relationship $$PV_1 = k_{51}IC_1 + k_{61}PP_1$$

wherein
$PV_1$ is the process variable signal,
$IC_1$ is the intermediate control signal,
$PP_1$ is the transformed signal,
$k_{51}$ and $k_{61}$ are constants not equal to zero.

The process variable signal thus produced can thereafter be utilized directly as a control signal or as a variable input to a process controller or in any other suitable manner as the basis for the generation of a process-altering action. The apparatus and method of the invention are particularly well suited for use in conjunction with control of a non-self-regulating reaction and/or control in response to a delayed measurement signal and/or control in response to a signal which is subject to incremental alternation. The process variable signal generated in accordance with the invention incorporates a predictive term which is continuous even though the process measurement signal from which the process variable signal is generated may exhibit a step change.

Additional objects and advantages of the invention will be apparent from the following detailed description of the drawing illustrating a preferred embodiment of the invention, from the specification as a whole, and from the claims appended hereto.

Referring to the drawing.

Figure 1:
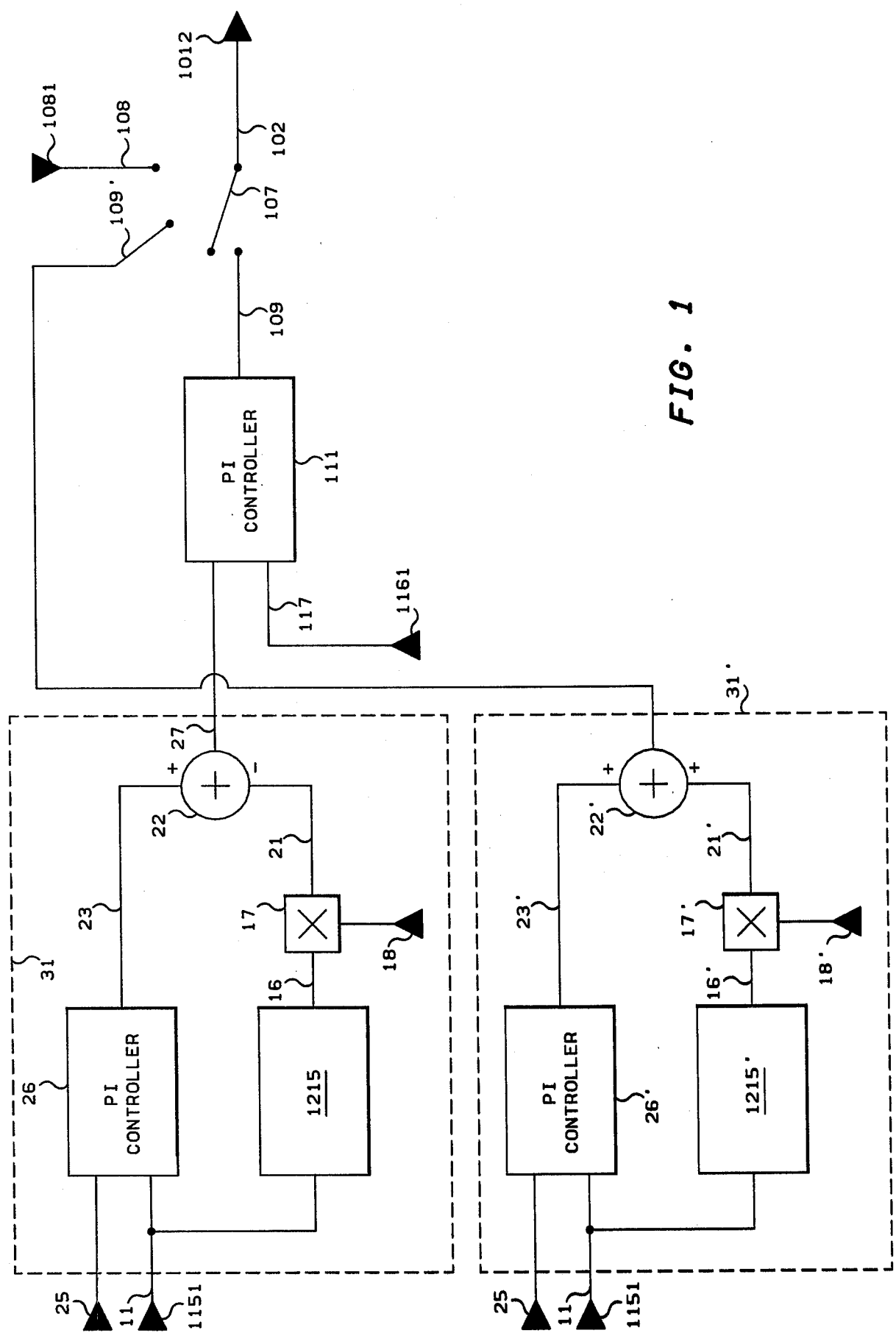
FIG. 1 is a schematic block diagram showing the apparatus and method for generating a process control signal in accordance with the invention incorporated into a three-way control system.

Referring now to FIG. 1, a process parameter measurement signal 11 representative of the value of a measured process parameter is provided by any suitable means. The symbol 1151 illustrates the input of a computer for accepting the signal. The process measurement signal 11 can be instantaneous or delayed and can be either continuous or subject to incremental changes.

The process parameter measurement signal 11 is passed to the variable input of a PI controller 26 (reverse acting controller) and to a transforming unit 1215. The transformation of signal 11 occurring in the transforming unit 1215 can also be expressed as a second or higher order lag applied to the signal 11 to generate a lagged signal and a time derivative of the lagged signal resulting in the transformed or derivative signal 16. This transformation is best and most accurately described in the Laplace transform by the equation $$PP_1 = \frac{k_{41}S}{(1 + c_1S)(1 + c_2S)\ldots(1 + c_nS)} \cdot MP$$

wherein $PP_1$ is the transformed signal 21 (which differs from the transformed signal 16 only by the constant factor $k_{41}$), MP is the process parameter measurement signal 11, $c_1, c_2, c_n$ are constants not equal to 0, S is the operator $d/dt$ and $n$ is an integer of 2 or higher; preferably $n$ is 2, 3 or 4, most preferably 2.

In the presently preferred embodiment, the transformation described (to generate $PP_1$ from MP) is carried out in a digital computer. In this embodiment the signal MP in digital form is first converted into a lagged process parameter measurement signal by applying a second or higher order lag to the process parameter measurement signal; then the first time derivative of this lagged signal is generated to result in the transformed signal. The analog circuitry is given to help more readily understand the invention.

A first order lag in the time domain can be generally defined as a transformation in response to a unit step in accordance with the general relationship $$O(t) = I(t)(1 - e^{-t/c_1})$$

where $O(t)$ is the time domain lagged output signal, $I(t)$ is the time domain unit step input signal, $t$ is time, $e$ is the natural or Napierian logarithm base, 2.7128..., and $c_1$ is a constant. In dealing with higher order lags it is appropriate and convenient to express the characteristics of lag elements in the Laplace transform S domain. In the S domain, the above relationship becomes $$O(S) = I(S)(1/c_1S+1)$$

where $O(S)$ and $I(S)$ are the respective S domain output and input signals, and $c_1$ is as previously defined. In the S domain, higher order lags having a single lag time constant will fulfill the general condition $$O(S) = I(S)\left[\frac{K^{1/n}}{CS + 1}\right]^n$$

where $O(S)$ and $I(S)$ are as previously defined, $n$ is an integer greater than 1, and C and K are constants. For second or higher order lags having possibly differing time constants, the S domain relationship between output and input signals can be expressed as $$O(S) = I(S)\frac{K_1}{c_1S + 1} \frac{K_2}{c_2S + 1} \frac{K_3}{c_3S + 1} \cdots \frac{K_n}{c_nS + 1}$$

where $O(S)$ and $I(S)$ are as previously defined and $c_1, c_2, c_3 \ldots c_n$ and $K_1, K_2, K_3 \ldots K_n$ are constants.

Although the use of a second order lag means is presently preferred, higher order lag means can also be used as long as such use is suitable under the circumstances and compatible with the control system in which it is utilized. As a practical matter, very high order lag means will ordinarily not be advantageous since the transfer function of such a lag means will tend to approach a pure deadtime delay and will begin to lose the advantage of providing a substantially continuous response to a step change in the process parameter measurement signal 11.

A multiplying means 17 thereafter applies a scaling factor 18 to the transformed signal 16 to produce a scaled transformed signal 21. The scaling factor signal 18 can be either greater than or less than 1, or can be equal to 1, but will not be 0. In order to show the particular application of the control system of this invention, two different process variable signal generators 31 and 31' are shown. The main difference between these two in addition to the absolute size of the various constants involved resides in the fact that the controller 26 is a reverse acting controller whereas the controller 26' is a direct acting controller; the scaled transformed signal 21 is quasi-subtracted from signal 23 so that signal 27 is representative of the weighted difference between PI controller output signal 23 and the transformed signal 16, whereas in case of unit 31' scaled transformed signal 21' is added to signal 23' so that the signal 109' is representative of the weighted sum of the output signal 23' of PI controller 26' and the transformed signal 16'.

The process parameter measurement signal is converted in a PI controller 26 (or respectively 26' in case of unit 31') into an output signal 23 (or respectively 23') that is related to the variable signal 11 by the relationship $$IC_1 = k_{11}(MP_1 - SP_1) + k_{21}\int(MP_1 - SP_1)dt + k_{31}(d/dt)(MP_1 - SP_1)$$

respectively $$IC_2 = k_{13}(MP_2 - SP_2) + k_{23}\int(MP_2 - SP_2)dt + k_{33}(d/dt)(MP_2 - SP_2)$$

wherein $IC_1$, $IC_2$ are the intermediate control signals 23, 23', respectively, MP is the process parameter measurement signal 11, SP is the setpoint signal 25, $k_{11}$, $k_{21}$, $k_{31}$ are constants defining the control dynamics of controller 26, $k_{31}$ being 0, $k_{11}$, $k_{21}$ being not 0 if controller 26 is the preferred PI controller, $k_{13}$, $k_{23}$, $k_{33}$ are constants defining the control dynamics of controller 26', $k_{13}$, $k_{23}$ being not 0, $k_{33}$ being 0 for the preferred embodiment of a PI controller 26'.

An adding means 22 (or respectively 22') accepts the intermediate control signal 23 (or 23' respectively) and the scaled transformed signal 21 (or respectively 21') as inputs thereto and generates a process variable signal 27 (or 109' respectively) representative of the sum of these two inputs. The process variable signal 27 (or respectively 109') is representative of the weighted difference (or respectively sum) of the intermediate control signal 23 (or 23' respectively) and the scaled transformed signal 21 (or 21' respectively). Although application of a scaling factor to the transformed signal 16, in order to achieve such a weighted sum, has been illustrated and is presently preferred for the purpose of using the value of the process parameter measurement signal 11 as the basis for control signal scaling and reference for control system continuity, a scaling factor could be applied to either the process parameter measurement signal 11 or the transformed signal 16 or to the intermediate control signal 23 or to two or more of these signals in order to produce a combined process variable signal 27 exhibiting the desired weighted relationship in the subtraction (or addition) of the two signals.

Generation of the transformed signal 16, that can be described as the time derivative of the lagged process parameter measurement signal, incorporates into the transformed signal 16 information suitable for indicating a prediction or delineating a trend of the process parameter measurement signal 11. This predictive information, when combined in a suitable weighted relationship with the intermediate control signal 23 (or 23') will yield a process variable signal 27 (or 109') which, depending upon the specific parameters and operating characteristics of the controlled process and upon the desired degree of predictive control, can be representative of the predicted value of the process parameter measurement signal at some future time, the present value of the measured process variable based on a measurement incorporating an inherent delay of some type, or any other similar purpose for which the available degree of predictive capability is suited.

The use of a second or higher order lag means is essential to the proper operation of the versatile predictive capabilities of the invention. The use of no lag means whatsoever would obviously result in a derivative signal which would consist of nothing more than a essentially instantaneous spike whenever presented with a process parameter measurement signal exhibiting a step change of any kind, and such an instantaneous spike would be of no use in the generation of a predictive component for the process variable signal 27 (or 109'). Use of a first order lag would do away with the instantaneous spike in the derivative signal but would still present a substantial discontinuity in the derivative signal whenever presented with a step change in the process parameter measurement signal 11 and would provide, in response to such a step change in the process parameter measurement signal 11, a derivative signal component which would begin at a relative high or low extreme and decay to a less extreme value. The use of the transform function defined, i.e. involving second and higher order lag means, however, provides a transformed signal 16 (or 16') which presents its predictive information not in the form of a spike of theoretically infinite amplitude nor as an immediate transition to a finite but abrupt change in value in response to a step change in the process parameter measurement signal 11, but provides a transformed signal 16 (or 16') which responds to a step change in the process parameter measurement signal 11 in a much more controlled manner. This type or controlled transformed signal 16 (or 16') produced by a second order or higher lag applied to the process measurement signal 11 followed by generating the derivative (d/dt) of the lagged signal will, when incorporated into a process variable signal 27 (or 109') provide predictive information within the process variable signal 27 (or 109') which will not cause undue disruption of the control system or process with which it is used. In addition, the use of a second or higher order lag means provides additional freedom in tuning the constants associated with the lag means to provide optimum interaction with the process and process control system utilized.

The process variable signals 27 and 109' generated in accordance with the invention can be utilized in any suitable manner for control of a process. As illustrated by FIG. 1, a presently preferred manner of utilizing the information contained within the process variable signals 27 and 109' is to provide signal 109 or 109' as a control signal that via switch 107 can be furnished via line 102 to the computer output 1012. Signal 27 is provided as a setpoint signal and 117 as variable input signal to a standard proportional-integral controller means 111 which produces a process control signal 109 in response to the difference between the process variable input signal 117 and the setpoint signal 27. The presently proposed process control signal 109 is one which satisfies the general conditions $$OS = k_{12}(PV_1-MS) + k_{22}\int(PV_1-MS)dt + k_{32}(d/dt)(PV_1-MS)$$

where OS is the process control signal 109, MS is the process variable signal 117, $PV_1$ is the setpoint signal 27, t is time, and $k_{12}$, $k_{22}$ and $k_{32}$ are constants, $k_{12}$ and $k_{22}$ not being 0, $k_{32}$ preferably being 0. In accepting a process parameter measurement signal 11 and delivering in response thereto a process control signal 109 or 109', the apparatus illustrated schematically by FIG. 1 is provided with controller means 31 and with similar controller means 31'. These can as such be substituted for a conventional controller or otherwise used to perform the control functions ordinarily performed by other controller means.

In the preferred embodiment of this invention, however, the controller means 31 provides the setpoint signal 27 for the PI controller 111 whereas the controller means 31' provides the control signal 109' directly. The PI controller 111 has its variable signal input connected to accept a variable signal 117, e.g., from a computer input 1161. The output from PI controller 111 provides a control signal 109. By means of a switch 107, which preferably is a part of a program of digital computer, either control signal 109, or control signal 109' or an extraneous control signal 1081, e.g., one provided from the control panel by an operator is supplied via line 108 to the control line 102 and, e.g., to the computer output 1012. In the drawing and description of the embodiments of this invention, no specific reference has been made to such elements as analog to digital converters. These elements have been omitted since they are well known in the art. In the preferred case of the control being carried out by a digital computer, the system shown in FIG. 1 will be a computer program. The control signal on line 102 will be a digital value which will be converted to an analog signal (voltage, current) in a digital to analog converter that can be thought of as being arranged in the output 1012. Similarly, the process parameter measurement is utilized by the computer program in digital form. The incoming analog signal correspondingly is converted into a digital input signal in an analog to digital converter which can be thought of as being located in the input 1151. These statements correspondingly apply to input 1161 and can apply to inputs 18, 18', 25 and 1081.

Figure 2:
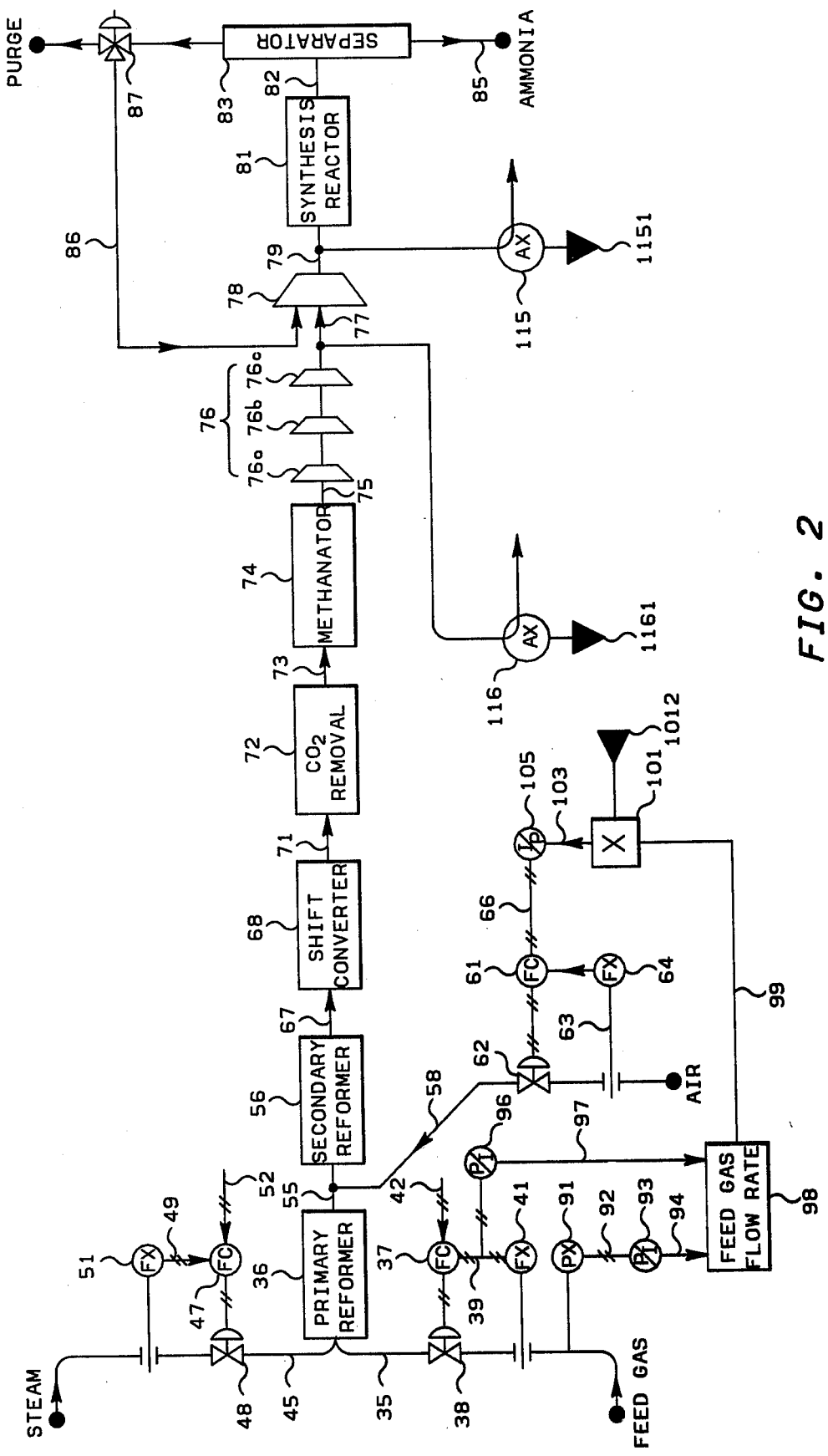
FIG. 2 is a schematic block diagram of an ammonia plant using the method and apparatus of the invention in the control of the process.

One way in which the apparatus and method of the invention can be applied in controlling a process is illustrated by FIG. 2. The process schematically illustrated by FIG. 2 is an ammonia synthesis process. In the process, a stream of natural gas or other light hydrocarbon material is introduced through a conduit means 35 which communicates with the inlet of a primary reformer means 36. The flow through the conduit means 35 is maintained at a predetermined rate by a flow controller 37 which regulates a valve means 38 in response to a comparison of the measured feed gas flow rate signal 39 delivered by a flow rate transducer means 41 and a gas flow rate setpoint signal 42 representative of a desired feed gas flow rate.

Steam is introduced through a conduit means 45 which also communicates with the inlet of the primary reformer means 36. A predetermined flow through the conduit 45 is maintained by a flow controller 47 which regulates a valve 48 in response to a comparison of a steam flow rate signal 49 generated by a flow rate transducing means 51 and a steam flow rate setpoint signal 52.

The effluent from the primary reformer 36 is directed through a conduit means 55 to the inlet of a second reformer means 56. Air or other free nitrogen-containing gas is introduced through a conduit means 58 which also communicates with the inlet of the secondary reformer means 56. The flow of air through the conduit means 58 is regulated by a flow controller means 61 which adjusts a valve means 62 in response to a comparison of an air flow rate signal 63 delivered by an air flow rate transducing means 64 and an air flow rate setpoint signal 66 which can be generated as hereinafter described.

In a typical operation, approximately 65 percent of the hydrocarbon present in the feedstream introduced through the conduit means 35 are converted to hydrogen, carbon monoxide, and carbon dioxide in the primary reformer means 36. As will be explained hereafter in greater detail, the amount of air introduced through the conduit means 58 is regulated to give a desired ratio of hydrogen to nitrogen in one or more portions of the downstream reaction. Additional hydrocarbons are converted in the secondary reformer means 56. The effluent from the secondary reformer means 56 is passed through a conduit means 67 to a shift converter means 68 wherein carbon monoxide and steam are converted to additional hydrogen and carbon dioxide. The effluent from the converter means 68 is directed through a conduit means 71 to carbon dioxide removal equipment 72. Carbon dioxide is typically removed, e.g., by absorption with monoethanol amine. The effluent from the carbon dioxide removal means 72 is directed through a conduit means 73 to the inlet of a methanator means 74 in which residual carbon dioxide and carbon monoxide which would act as a catalyst poison in the following synthesis reaction, are converted to methane, which acts as an inert material in the succeeding ammonia synthesis reaction. The effluent from the methanator means 74 is passed through a conduit means 75 to a first stage 76a of a first compressor means 76 which delivers a compressed effluent stream therefrom through a conduit means 77 to the inlet of a second compressor means 78. The first compressor means 76 comprises a plurality of compressor stages which are schematically shown as stages 76a, 76b, 76c in the drawing.

The compressed gases from the second compressor means 78 are directed through a conduit means 79 to a synthesis reactor 81 in which hydrogen and nitrogen are converted to ammonia. The effluent from the reactor 81 is directed through a conduit means 82 to a separation means 83 wherein the ammonia product is largely condensed and separated from unreacted gases. An ammonia product stream is removed from the separation means 83 through a conduit means 85. The unreacted gases containing primarily hydrogen, nitrogen and ammonia are directed through a conduit means 86 to the inlet of the second compressor means 78 where they are recompressed and reintroduced into the synthesis reactor 81. A portion of the unconverted gases may be bled from the conduit means 86 by a purge valve means 87 as necessary to prevent undesirable buildup of inert gases carried by the recycled unreacted gases to the synthesis reactor 81.

The process of FIG. 2 thus far described constitutes a typical ammonia-producing operation of a type well known in the art. This reaction is one in which the apparatus and method of the invention are particularly useful for control purposes. In the control scheme illustrated by FIG. 2, a pressure transducer means 91 provides a feed gas pressure signal 92 representative of the pressure within the conduit means 35. The pressure signal 92 is then converted by a pressure/current transducer means 93 to an equivalent electrical feed gas pressure signal 94. A second pressure/current transducer means 96 converts the feed gas flow rate signal 39 to an equivalent electrical signal 97. Both the feed-gas flow rate signal 97 and feed-gas pressure signal 94 are provided to a feed-gas flow rate correction means 98 which generates a corrected or standardized feed-gas flow rate signal 99. The correction applied by the flow rate correction means 98 can be based on empirical or theoretical relationships between feed-gas delivery pressure and a standard flow rate such as the mass flow rate of feed gas material. Although correction for pressure only is illustrated by FIG. 2, additional correction for feed gas temperature and/or other similar variables could be made as necessary or desirable for a particular installation or reaction. The implementation of the correction factor application by the correction means 98 can be accomplished using standard analog or digital techniques.

The corrected feed-gas flow rate signal 99 is used as illustrated by a multiplying means 101 to convert a setpoint signal 1012 representative of the desired ratio of air-to-gas to be provided to the reaction into an air flow rate setpoint signal 103. The air flow rate setpoint signal 103 is then converted from electrical to pneumatic format by a current/pressure transducer means 105 to produce the pneumatic air flow rate setpoint signal 66.

The air-to-gas flow rate ratio setpoint signal 1012 (see FIG. 1) is selected by a switch means 107 from a manual fixed setpoint signal 1081 or one of two generated setpoint signals 109 or 109'.

The control signals or the generated air-to-gas flow rate ratio setpoint signals 109 and 109' are generated as described above in connection with FIG. 1.

In order to help more readily understand the invention, the various signals appearing in FIG. 1 will be illustrated in the following by their meaning for the ammonia process:

11:actual hydrogen/nitrogen mole ratio in the total feed,
25:desired hydrogen/nitrogen mole ratio in the total feed (setpoint),
23:desired hydrogen/nitrogen mole ratio in the fresh feed[1],
23':desired air/gas mole ratio in the feed (flow in 58/flow in 35)[1]
1161:actual hydrogen/nitrogen mole ratio in the fresh feed,
109:desired air/gas mole ratio in the fresh feed,
109':desired air/gas mole ratio in the fresh feed[1],
27:desired hydrogen/nitrogen mole ratio in the fresh feed[1].

1. The signals 23 and 27 as well as respectively the signals 23' and 109' differ from each other by the transformed signals 21, or respectively 21', applied in order to achieve the predictive control.

Although it is presently preferred to use mole flow ratios to be represented by the various signals, other units can be used. It is also possible to modify the various signals in order to compensate for non-ideal gas behavior or to change the signals in response to prevailing pressure and temperature conditions.

An analysis transducer means 115 accepts a sample of material flowing through the conduit means 79 to the synthesis reactor 81 and generates analysis signal 1151 representative of the ratio of hydrogen-to-nitrogen entering the synthesis reactor 81. The analysis controller 31 (see FIG. 1) produces, in response to a comparison of the measured hydrogen-to-nitrogen ratio represented by signal 1151 (line 11, FIG. 1) and a required hydrogen-to-nitrogen ratio represented by a setpoint signal 25, a controller output signal 109 representative of the required air-to-gas ratio in the fresh feed provided to the synthesis reactor loop. A second analysis transducer means 116, in response to a sample of material from the compressed gas effluent of one of the compressor stages 76a, b, or c (here shown as taken from the effluent from stage 76c) generates and delivers analysis signal 1161 representative of the hydrogen-to-nitrogen ratio in the fresh feed to the synthesis reaction.

The PI controller 111 in response to a comparison of the hydrogen-to-nitrogen fresh feed mole flow ratio signal 117 and the desired $H_2/N_2$ mole ratio signal 27 generates the setpoint signal 109 (1012) representative of the mole ratio of air-flow to feed-gas flow necessary to provide the required hydrogen-to-nitrogen ratio in the fresh feed stream 77. The hydrogen/nitrogen ratio of the fresh feed can also be measured at other locations, e.g., at the inlet to the methanator 74; however, it is preferred to measure this ratio at the compressed effluent of the first compressor 76, since the methanator means 74 may utilize a small amount of free hydrogen in converting the residual carbon dioxide and small amount of carbon monoxide to methane.

The use of two analysis controllers utilizing separate measurements within the synthesis reactor loop and outside the synthesis reactor loop for the fresh feed entering the reaction loop is desirable since the hydrogen-to-nitrogen concentration required in the fresh feed will not necessarily be the same as that required within the material entering the synthesis reactor 81. For example, the required hydrogen-to-nitrogen ratio in the feed gas to the synthesis reactor 81 will not necessarily be the three-to-one mol ratio in which the two gases combine to form ammonia due to the fact that hydrogen and nitrogen have different solubilities in the ammonia product with nitrogen being more soluble than hydrogen in ammonia. The ammonia product leaving the separator 83 will contain dissolved, unreacted hydrogen and nitrogen in a ratio not exactly three-to-one since the amount of dissolved nitrogen will be proportionately higher than the amount of dissolved hydrogen in the product. Whatever the desired ratio of hydrogen-to-nitrogen entering the synthesis reactor 81, it can readily be seen that departure from this desired ratio will require an alteration of the desired ratio of hydrogen-to-nitrogen in the fresh feed to the reactor. It can also be readily seen, however, that the average ratio of hydrogen-to-nitrogen in the fresh feed material is necessarily substantially the same as the hydrogen-to-nitrogen ratio in the dissolved, unreacted gases exiting the separator 83 through the ammonia product conduit means 85. In addition, the amount of fresh feed entering the reaction loop is ordinarily only a fraction of the amount of recycled material flowing through the conduit means 86. It can therefore be readily seen that the reaction is of a non-self-regulating nature in that modification of the hydrogen-to-nitrogen concentration in the fresh feed, in order to maintain optimum reaction conditions within the synthesis reactor 81, will result in a buildup of either hydrogen or nitrogen within the reaction loop unless additional subsequent action is taken. Using the particular control system illustrated by FIG. 2, the problem of potential instability is more acute since the use of chromatographic analysis equipment to generate the hydrogen-to-nitrogen ratio signals 11 and 117 results in a delay between the time which a sample is taken from the process and the time which the constituent ratio information is available for control use. In addition, the chromatographic analysis equipment produces an output signal which is subject to incremental alteration at the end of each analysis cycle.

The predictive information incorporated into the output signal 109 of the controller means 31 when the apparatus and method of the invention are used in implementing the analysis controller 31 will, by offsetting the delay of the analysis equipment in generating the signal 11' and by avoiding disruptive instantaneous changes in the derivative portion of the output signal 27, provide a setpoint signal to the analysis controller 111 representative of the anticipated need of the hydrogen to nitrogen content in the fresh feed and thereby avoid possible disruptive or oscillatory changes in the process conditions.

Although the control of the process illustrated by FIG. 2 utilizing a combination of pneumatic and electrical signals has been illustrated, a variety of signals and signal formats can be utilized in equivalent embodiments of the invention. The electrical portion of the control system can be electrical analog, digital electronic, or a combination thereof, or any other suitable information handling system. Presently preferred apparatus for implementation of the electrical portion of a control system utilizing the apparatus and method of the invention is a digital computer system. For purposes of illustrating the invention, an analog implementation of the apparatus of FIG. 1 suitable for use as the analysis controller 31 or 31' of FIG. 1 is illustrated by FIGS. 3–6.

Figures 3, 4:
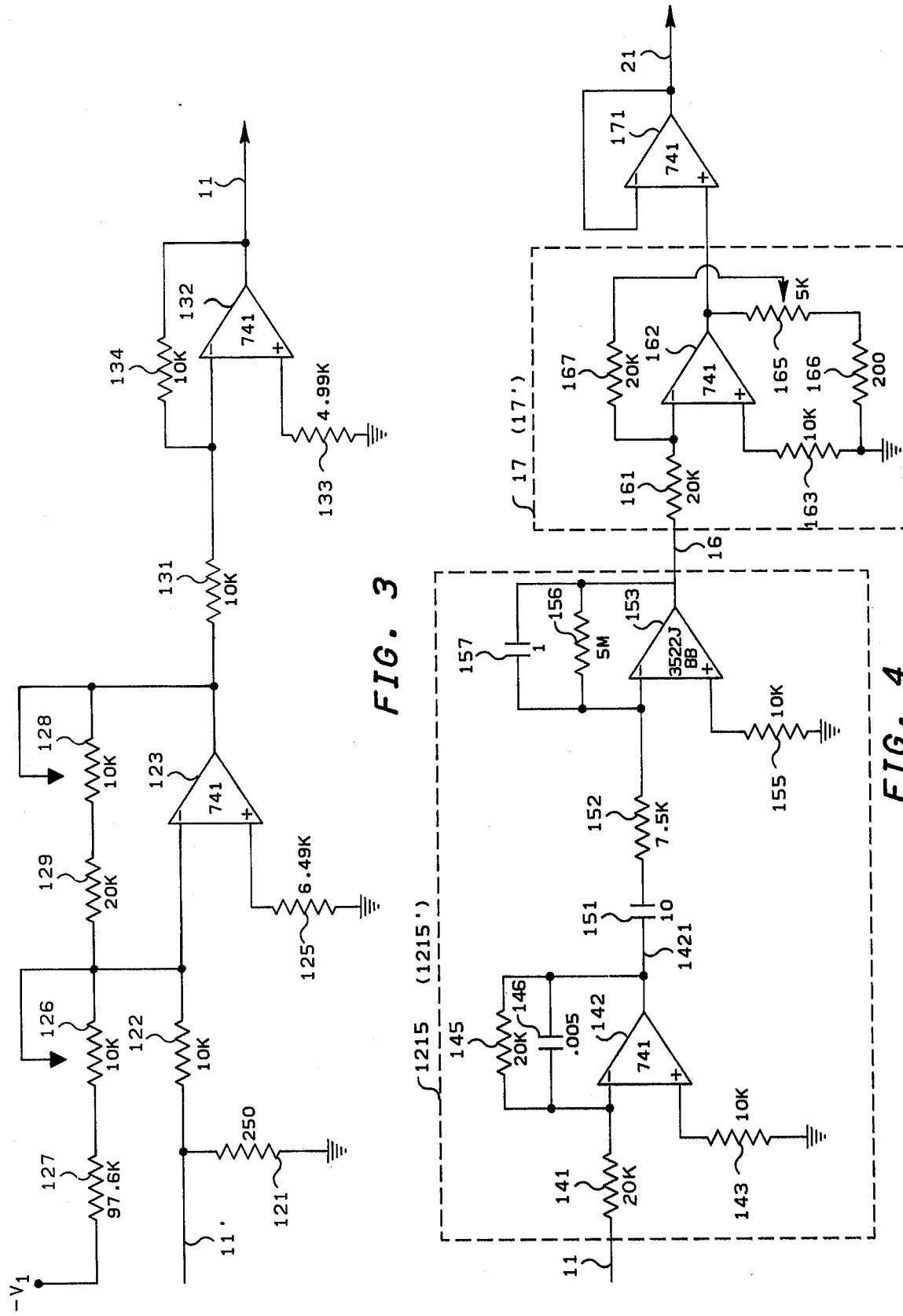
FIGS. 3-6 are schematic electrical diagrams illustrating preferred analog implementations of the apparatus of FIG. 1.

In FIG. 3 there is illustrated an electrical analog circuit wherein a raw process parameter measurement signal 11' can be scaled and adjusted, if necessary, to be compatible with the range and format of the components from which the controller means 31 or 31' is constructed. The raw measurement signal 11' is applied through a resistor 121 to ground and through a resistor 122 to the inverting terminal of an operational amplifier 123. The noninverting terminal of the operational amplifier 123 is connected through a resistor 125 to ground. The inverting input terminal of the operational amplifier 123 is connected through a variable resistance 126 and additional resistor 127 to a negative voltage reference, $-V_1$. The variable resistor 126 provides zero adjustment of the output signal of the amplifier 123. A variable resistance 128 in series with a resistor 129 connected between the output of the amplifier 123 and the inverting input thereof provides span adjustment.

The output of the operational amplifier 123 is applied through a resistor 131 to the inverting input terminal of an operational amplifier 132. The noninverting terminal of the amplifier 132 is connected through a resistor 133 to ground, and the output terminal of the amplifier 132 is connected through a resistor 134 through the inverting input terminal thereof. While the resistors 131 and 134 can be of different values in order to apply an additional scaling factor, it is preferred that all necessary scaling take place through adjustment of the resistor 128 associated with the amplifier 123 and that resistors 131 and 134 be of substantially the same value in order to permit the operational amplifier 132 to perform the function of a simple signal inversion. While the use of the circuit illustrated by FIG. 3 may not be necessary in all cases, such a circuit is preferably provided in order to make possible the acceptance of various raw process parameter measurement signals 11' and to deliver in response thereto scaled signals of the same polarity which have been suitably scaled and related to a chosen reference or zero point.

FIG. 4 illustrates the apparatus by which the refined process parameter measurement signal 11 from the output of the amplifier 132 of FIG. 3 can be used to generate the transformed signal 16 of FIG. 1. The signal 11 is applied through a resistor 141 to the inverting input of an operational amplifier 142. The noninverting input of the amplifier 142 is connected through a resistor 143 to ground, and the output of the amplifier 142 is connected through the parallel combination of a resistor 145 and a capacitor 146 to the inverting input terminal thereof. Although the parallel combination of the resistor 145 and capacitor 146 can be used to impart a lag to the signal 11, the presently preferred embodiment of the invention utilizes a relatively small capacitor 146 so that the circuit associated with the amplifier 142 provides signal inversion and a desired, but relatively small, amount of signal conditioning. While the lag and derivative portions of the signal modification can be accomplished separately, the circuit illustrated in FIG. 4 is particularly preferred for its ability to provide the transformation that can be described as both second order lag and following time derivative action using a minimum of circuitry. The signal appearing at the output of the operational amplifier 142 is supplied to a basic analog differentiator circuit having an additional series resistor in the input circuit and an additional parallel capacitor in the feedback circuit. These components provide a transformation that is best described in the S domain by the formula:

$$PP_1 = \frac{S}{(1 + c_1 S)(1 + c_2 S)\ldots(1 + c_n S)} \cdot MP$$

wherein $PP_1$ is signal 16 and $MP$ is the modified process parameter measurement signal 1421. The output signal from the operational amplifier 142 is provided through the series combination of a capacitor 151 and a resistor 152 to the inverting input of an operational amplifier 153. The noninverting input of the amplifier 153 is connected through a resistor 155 to ground. The output of the amplifier 153 is connected to the inverting input thereof through the parallel combination of a resistor 156 and a capacitor 157. The output of the operational amplifier 153 will therefore exhibit substantially the same relationship to the output of the amplifier 142 as would be accomplished by separately applying a second order lag to the output of amplifier 142 and differentiating the lagged signal as expressed by the equation shown above. One lag time constant will be determined by the value of capacitor 151 and resistor 152, the second lag time constant will be determined by the values of capacitor 157 and resistor 156, and the derivative time constant will be determined by the values of capacitor 151 and resistor 156.

In order to provide scaling of the magnitude of the differentiated signal received from the output of amplifier 153, a scaling unit 17 (17'; see also FIG. 1) is provided for. The amplifier 153 output is connected through a resistor 161 to the inverting input of an operational amplifier 162. The noninverting input terminal of the amplifier 162 is connected through a resistor 163 to ground. The output of the amplifier 162 is connected through the series combination of a potentiometer resistor 165 and a resistor 166 to ground. The sweep terminal of the potentiometer 165 is connected through a resistor 167 to the inverting input terminal of the amplifier 162. Adjustment of the effective feedback resistance of the amplifier 162 by adjustment of the potentiometer 165 will permit substantial adjustment of the gain of the amplifier 162 in order to perform at least a portion, and preferably all, of the scaling of the derivative signal 16 necessary to provide the desired relationship between the scaled derivative signal 21 and the process measurement signal 11. The output of the operational amplifier 162 is provided to the noninverting input of an operational amplifier 171. The output of the amplifier 171 is connected directly to the inverting input thereof so that the amplifier 171 provides a unity gain voltage follower or buffer effect to present the output of the amplifier 162 as a scaled derivative signal 21 suitable for use by other control equipment without interference with the operation of the amplifier 162 or other circuits of FIG. 4.

As previously indicated, the capacitor 146 is, in the presently preferred embodiment, sufficiently small that no substantial lag effect is provided by its presence within the circuit. If, however, a lag of higher order than the presently preferred second order lag is desired, the size of the capacitor 146 can be increased to produce such a lag and/or other circuitry suitable for introducing a desired degree of lag into the process measurement signal 11 prior to its application to the circuitry associated with the operational amplifier 153 can be provided.

Figure 5A:
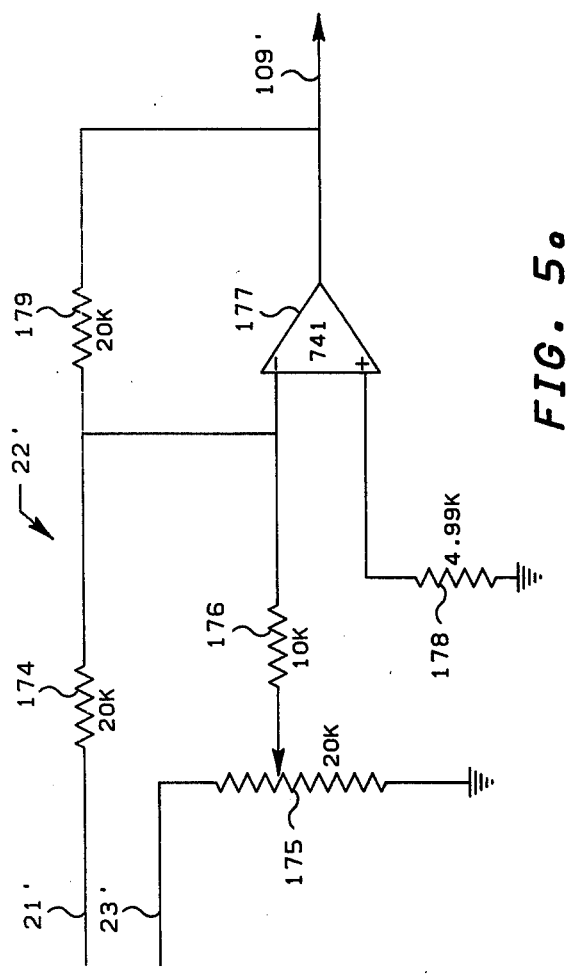

FIG. 5a illustrates the presently preferred circuitry by which the adding means 22' of FIG. 1 can be implemented. The intermediate control signal 23' is applied through a potentiometer 175 to ground with the sweep terminal of the potentiometer 175 being connected through a resistor 176 to the inverting terminal of an operational amplifier 177. The scaled transformed signal 21' is applied through a resistor 174 to the inverting terminal of the amplifier 177. The noninverting input of the amplifier 177 is connected through a resistor 178 to ground, and the output of the amplifier 177 is connected through a resistor 179 to the inverting input thereof. While the resistors 174 and 179 and the combination of the potentiometer 175 and the resistor 176 can be adjusted to provide effective scaling of the scaled transformed signal 21' and the intermediate control signal 23', it is preferred that all scaling of those signals be accomplished elsewhere, such as by the scaling amplifier 123 of FIG. 3 in the case of the process parameter measurement signal 11 and by the scaling amplifier 162 of FIG. 4 in the case of the scaled transformed signal 21, and that the amplifier 177 of FIG. 5a operate solely as an adder to provide a first process variable signal 109', whereas amplifier 1771 of FIG. 5b operates solely as a subtractor to provide an output process variable signal 27 representative of the sum of the intermediate control signal 23 and the scaled transformed signal 21. The combination of the potentiometer 175 and resistor 176 will therefore ordinarily have exactly the same equivalent resistance as the resistor 174. In many circumstances it would, of course, be acceptable to apply both signals 23' and 21' to the inverting input of the amplifier 177 through identical resistors. In the particular embodiment illustrated by FIG. 5a, however, the potentiometer 175 is provided for the purpose of making any minor correction which may be necessary in the scaling of the intermediate control signal 23' arising from the fact that after the signal was originally scaled, it was inverted by the amplifier 132 of FIG. 3. Any minor scaling error introduced as a result of the effective gain of the amplifier 132 not being exactly minus one is preferably corrected by adjustment of the potentiometer 175 so that the effective intermediate control signal 23' presented to the amplifier 177 is as close as possible to exactly the same magnitude as the output of the amplifier 123. In addition, the magnitude of the effective gain of the amplifier 177 is preferably one, with the inherent inversion of the amplifier making the actual gain equal to minus one, so that the process variable signal 109' is accurately representative of the value of the intermediate control signal 23' which has added thereto a scaled derivative signal having second or higher order lag and derivative characteristics determined by the circuitry associated with the amplifiers 142 and 153 of FIG. 4 (the transformed signal) and having a magnitude determined by the circuitry associated with the amplifier 162 of FIG. 4. Adjustment of the potentiometer 165 associated with the operational amplifier 162 will determine the overall magnitude of the scaled transformed signal 21' and will therefore determine the amount of derivative component incorporated within the intermediate control signal 109'.

Figure 5B:
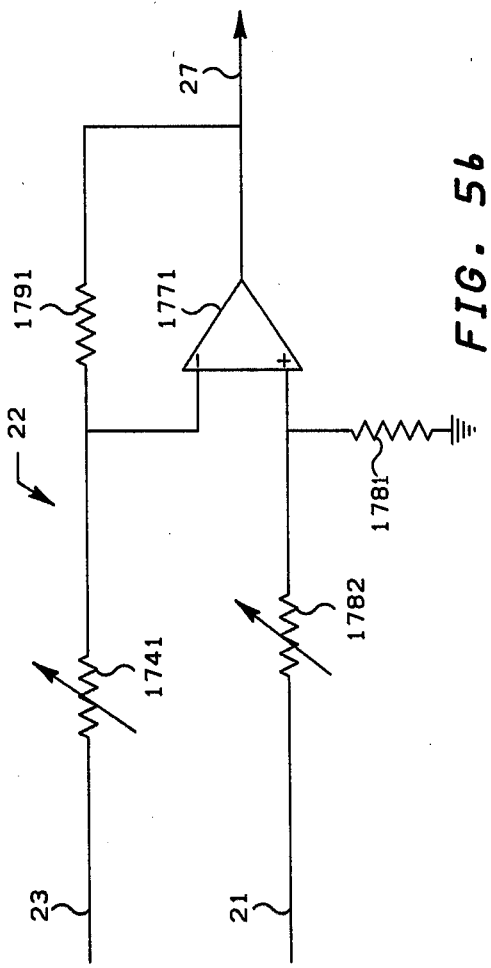

Whereas unit 22' essentially adds the two signals 21' and 23', the unit 22 shown schematically in FIG. 5b essentially generates an output signal 27 representative of the weighted difference between signal 21 and signal 23. The transformed (first time derivative of second order lag of input signal 11) signal 21 is applied via a resistor 1782 to the non-inverting input of the operational amplifier 1771. This non-inverting input is connected to ground via resistor 1781. The inverting input of operational amplifier is connected via resistor 1741 to accept the intermediate process control signal 23. The output of this amplifier is connected to the inverting input via a resistor 1791. The resistors 1741 and 1782 are shown to have adjustable resistance so that the signals 21 and 23 can be scaled before being combined with each other for similar reasons as described above.

Figure 6:
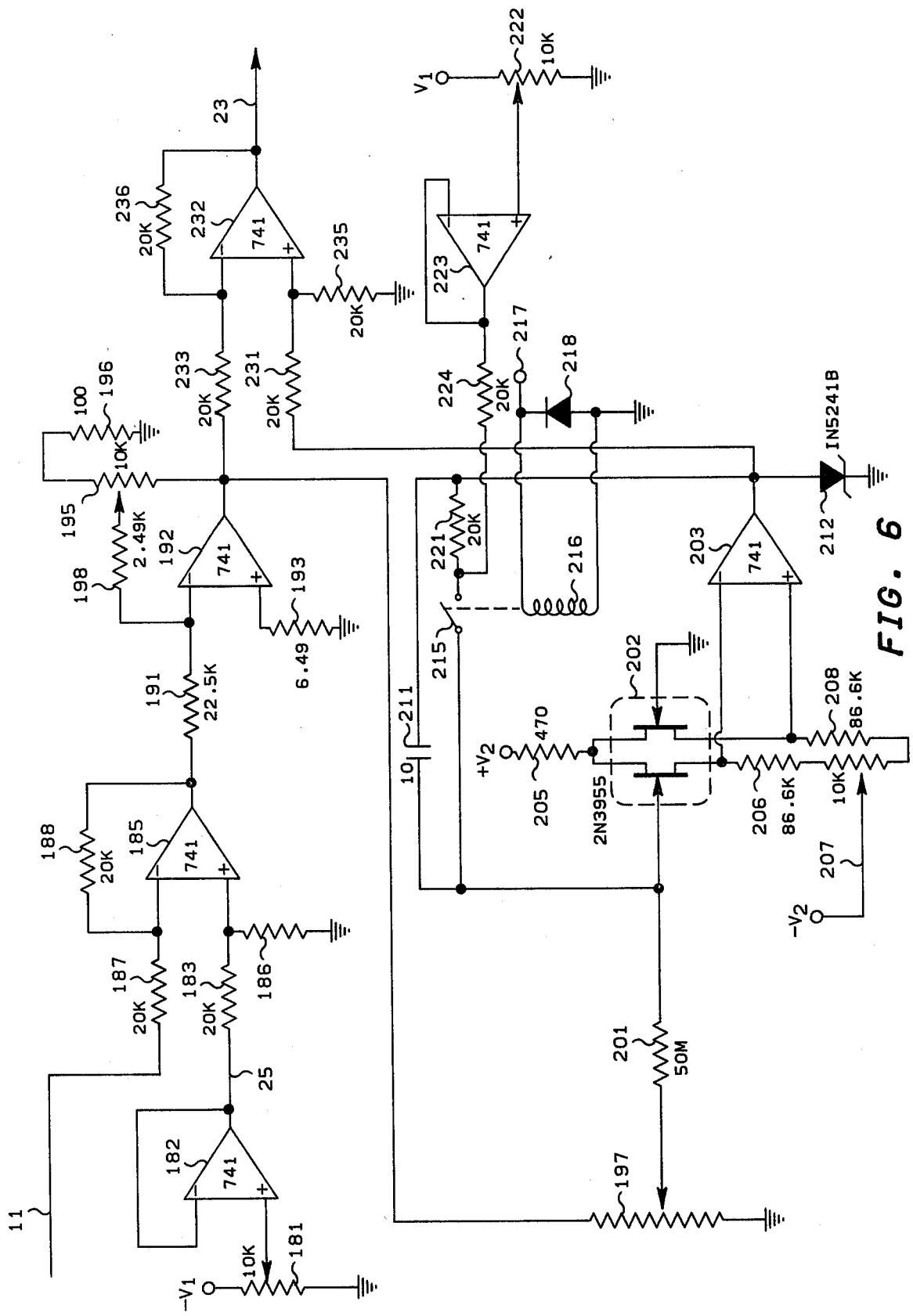

FIG. 6 illustrates a preferred electrical analog proportional-integral controller circuit by which the process parameter signal 11 is utilized to produce a suitable intermediate control signal 23. A potentiometer 181 is connected between a suitable reference voltage $-V_1$ and ground with the sweep terminal of the potentiometer 181 being adjusted to provide a setpoint signal 25 by delivering the required voltage to the noninverting input of an operational amplifier 182. The amplifier 182 is connected as a unity gain voltage follower or buffer amplifier with the output thereof connected directly to the inverting input terminal of the amplifier so that an amplifier output signal representative of the selected setpoint output signal 25 can be delivered without interference of the operation of the potentiometer 181 or voltage source $-V_1$. The output of the amplifier 182 is applied to a resistor 183 to the noninverting input of an operational amplifier 185. The noninverting input of the amplifier 185 is also connected to ground through a resistor 186. The variable signal 11 is applied to the inverting input of the operational amplifier 185 through a resistor 187, and the output of the amplifier 185 is connected to the inverting input thereof through a resistor 188. Resistors 183, 187 and 188 are preferably of substantially equal value so that the output signal of the amplifier 185 is representative of the difference between the variable signal 11 and the setpoint signal 25.

The output of the operational amplifier 185 is connected through a resistor 191 to the inverting input of an operational amplifier 192. The noninverting input of the amplifier 192 is connected to a resistor 193 to ground. The output of the operational amplifier 192 is connected through a first potentiometer 195 in series with a resistor 196 to ground and is also connected through a parallel potentiometer 197 to ground. The sweep terminal of the potentiometer 195 is connected through a resistor 198 to the inverting input of the amplifier 192. The voltage divider capability of the potentiometer 195 in conjunction with the feedback resistor 198 makes it possible to adjust the effective gain of the amplifier 192 over a substantial range. The gain of the amplifier 192 is in effect the proportional gain of the controller, and adjustment of the potentiometer 195 to determine the proportional gain of the controller is preferred.

The integral gain of the integrating controller circuit is determined by the adjustment of the potentiometer 197. The overall integral gain constant of the preferred circuit illustrated will, of course, be dependent upon both the proportional gain setting of the potentiometer 195 and the integral gain setting of the potentiometer 197. The sweep terminal of the potentiometer 197 is connected through a resistor 201 to the input terminal of a transistor pair combination normally referred to in the art as a dual-junction field effect transistor (FET) 202. In general terms, the transistor 202 along with its associated circuitry and the operational amplifier 203 perform the same function as a standard operational amplifier, and in many applications a standard operational amplifier could be used in its place. The use of a dual-junction FET as illustrated is preferred, however, due to the ability of the circuit to provide extremely stable amplification and high input impedance so that accurate integration of signals can be achieved over long periods of time without difficulties resulting form current leakage or other similar difficulties. The transistor circuit is connected through a resistor 205 to a positive voltage source $V_2$ and the output terminals thereof are connected through the series combination of a resistor 206, a potentiometer 207, and a resistor 208 with the sweep terminal of the potentiometer 207 being connected through a negative voltage supply $-V_2$. The output terminals of the FET 202 are also connected as illustrated to the inputs of the operational amplifier 203. The output of the amplifier 203 is connected through a capacitor 211 to the input of the transistor pair 202 to provide capacitor feedback effecting integration of the signal applied to the circuit to the resistor 201. A zener diode 212 is connected between the output of the amplifier 203 and ground in order to prevent generation of amplifier 203 output signals which could result in "wind-up" of the integration circuit.

An integrator reset and initialization circuit illustrated by FIG. 6 comprises a switch means 215 having associated therewith an actuating means 216 which will close the switch 215 upon application of a predetermined signal to a terminal 217. A diode 218 between the terminal 217 and ground prevents actuation of the switch means 215 by a signal of incorrect polarity. When a proper reset signal is applied to the terminal 217, the switch means 215 is closed and the capacitor 211 is discharged through a resistor 221. The circuit of FIG. 6 is also equipped with means for initializing the charge on the capacitor 221 at the time it is reset by applying a voltage at the junction between resistors 201 and 221 when the switch 215 is closed. The voltage thus applied is determined by an initialization signal $V_1$ applied across a potentiometer 222 to ground with the sweep terminal of the potentiometer providing a voltage to a yield to gain voltage follower or buffer amplifier 223. The output of the amplifier 223 applied through a resistor 224 provides the voltage which can be used to initialize the charge on the capacitor 221.

The output of the amplifier 203, representing the integral portion of the signal generated by the proportional-integral controller of FIG. 6 is applied through a resistor 231 to the noninverting input of an operational amplifier 232. The output of the amplifier 192, representing the proportional portion of the signal generated by the proportional-integral controller of FIG. 6, is applied through a resistor 233 to the inverting terminal of the same amplifier 232. The noninverting terminal of the amplifier 232 is connected through a resistor 235 to ground, and the output terminal of the amplifier 232 is connected through a resistor 236 to the inverting input terminal thereof. While the general configuration of the circuit associated with amplifier 232 is one of a subtracting amplifier, the control signal 23 is representative of the sum of the proportional and integral signals generated by the circuit of FIG. 6. This is apparent when it is considered that although the output of the amplifier 192 is applied directly through the input resistor 233 to the operational amplifier 232, the circuit providing the integral portion of the controller output performs a signal inversion in generating the integrated output signal. Subtracting the proportional signal from the integral signal therefore provides the same controller output signal 23 as would inverting one of the signals to provide uniform polarity then adding the signals. The apparatus and method of the invention can obviously be implemented in many ways utilizing the disclosure provided herein. For example, it may be desirable to provide resetting circuits for capacitors 151 and 157 of FIG. 4 in much the same manner that a resetting circuit is provided for the capacitor 211 of FIG. 6. If desired, a meter or other measuring or recording instrument can be connected between the output of amplifier 123 and the output of amplifier 182 in order to continuously monitor or to provide a recording of the difference between the process measurement signal 11 and the setpoint signal 25. The PI controller 26 is as described a reverse acting controller. The main difference to the controllers 26' and 111 is that controllers 26' and 111 are direct acting controllers. This constitutes, however, a minor difference in circuitry that as such is known to persons skilled in the art. Therefore, a detailed description thereof can be avoided. In the analog embodiment of the invention illustrated by FIGS. 3-6, the following circuit components will operate satisfactorily;

| | |
|---|---|
| Controller 111 | P.I. controller AAI component NO. B03979 and derivative feedback sold by Applied Automation Inc. Pawhuska Road, Bartlesville, OK 74004 |
| Analyzers 115 and 116 | Model 102 process chromatograph Applied Automation Inc. Bartlesville, OK 74004 |
| Resistor 201 | 50 megohms |
| Resistor 152 | 7.5 megohms |
| Resistor 156 | 5 megohms |

-continued

| | |
|---|---|
| Resistor 127 | 97.6 kilohms |
| Resistors 206 and 208 | 86.6 kilohms |
| Resistor 191 | 22.5 kilohms |
| Resistors 129, 141, 145, 161, 167, 174, 179, 183, 186, 187, 188, 221, 224, 231, 233, 235 and 236 | 20 kilohms |
| Resistors 122, 131, 134, 143, 155, 163 and 176 | 10 kilohms |
| Resistors 125 and 193 | 6.49 kilohms |
| Resistors 133 and 178 | 4.99 kilohms |
| Resistor 198 | 2.49 kilohms |
| Resistor 205 | 470 ohms |
| Resistor 121 | 250 ohms |
| Resistor 166 | 200 ohms |
| Resistor 196 | 100 ohms |
| Potentiometer 175 | 20 kilohms |
| Potentiometers 126, 128, 181, 195, 197, 207 and 222 | 10 kilohms |
| Potentiometer 165 | 5 kilohms |
| Capacitors 151 and 211 | 10 microfarad |
| Capacitor 157 | 1 microfarad |
| Capacitor 146 | 0.005 microfarad |
| Dual-junction FET 202 | 2N3955 |
| Operational amplifier 153 | Model 3522J Burr-Brown Research Corp. International Airport Ind. Park Tucson, Arizona 85706 |
| Operational amplifiers 123, 132, 142, 162, 171, 177, 182, 185, 192, 203, 223 and 232 | Type TC 741 - Motorola, Inc. or Model F7537 - Fairchild Camera Instrument Corp., Mt. View, Calif. 94042 |
| Zener diode 212 | IN 5241B sold by Motorola, Inc. Phoenix, Ariz. 85008 |

While the invention has been illustrated in conjunction with an analog embodiment thereof, those skilled in the art will be able to implement the method and apparatus of the invention using various equivalent apparatus. A programmed digital computer is a presently preferred implementation for carrying out the overall process of this invention. In this embodiment, as explained above, the transformed signal is generated by first generating a lagged process parameter measurement signal by applying a second or higher order lag to the process parameter measurement signal. From this the transformed signal is obtained by generating the first time derivative of said lagged process parameter measurement signal. The second or higher order lags and the first time derivative are both program subroutines that are as such known to persons skilled in the art so that a detailed description thereof can be avoided. Implementation of the apparatus and method of the invention utilizing a programmed digital computer is particularly advantageous in those situations where as existing computing capability can be used to provide appropriate control without the need for investment of a substantial amount of additional electronic equipment. These and other variations and modifications will be apparent to those skilled in the art within the scope of the foregoing specification of the invention and of the appended claims thereto.

We claim:

1. An apparatus comprising:
   a. a first controller for accepting a first process parameter measurement signal and a process parameter setpoint signal and delivering in response thereto an intermediate control signal,
   b. first transforming means for accepting said first process parameter measurement signal and transforming it into a first predictive process parameter signal that is related to said process parameter measurement signal essentially by the relationship:

$$PP_1 = \frac{k_{41}S}{(1 + c_1S)\ldots(1 + c_nS)} \cdot MP$$

wherein
   $MP$ is said first process parameter measurement signal,
   $PP_1$ is said predictive process parameter signal,
   $S$ is the Laplace transform symbol $(d/dt)$,
   $k_{41}$ is a constant not equal to 0,
   $c_1\ldots c_n$ are constants not equal to 0,
   $n$ is an integer of at least 2,
   c. first signal combining means for accepting said first intermediate control signal and said first predictive process parameter signal and delivering in response thereto a first process variable signal being the weighted sum or difference between the intermediate control signal and said predictive process parameter signal.

2. An apparatus in accordance with claim 1 wherein said first controller generates said intermediate control signal related to the time integral of the difference between said process parameter measurement signal and said process parameter setpoint signal.

3. An apparatus in accordance with claim 2 wherein said first controller generates an intermediate control signal which is related to said first process parameter measurement signal and said process parameter setpoint signal by the equation $$IC_1 = k_{11}(MP_1-SP_1) + k_{21}\int(MP_1-SP_1)dt + k_{31}(d/dt)(MP_1-SP_1)$$

wherein
   $MP_1$ is said first process parameter measurement signal,
   $SP_1$ is said process parameter setpoint signal,
   $IC_1$ is said intermediate control signal,
   $k_{11}, k_{21}, k_{31}$ are constants, $k_{11}$ and $k_{21}$ not being 0,
   the other symbols being the mathematical symbols for time derivative and time integral.

4. An apparatus in accordance with claim 1 additionally comprising a second controller means for accepting said first process variable signal and a second process variable measurement signal and delivering an output signal related to the difference between said first process variable signal and said second process variable measurement signal.

5. An apparatus in accordance with claim 4 wherein said second controller generates an output signal related to said first process variable signal and to said second process variable measurement signal by the relationship $$OS = k_{12}(PV_1-MS) + k_{22}\int(PV_1-MS)dt + k_{32}(d/dt)(PV_1-MS)$$

wherein
   $OS$ is said output signal,
   $PV_1$ is said first process variable signal,
   $MS$ is said second process variable measurement signal,
   $k_{12}, k_{22}, k_{32}$ are constants, $k_{12}$ and $k_{22}$ not being 0.

6. An apparatus in accordance with claim 4 further comprising
   a. third controller means for accepting said first process parameter measurement signal and a second process parameter setpoint signal and delivering in response thereto a second intermediate control signal, b. second transforming means for accepting said first process parameter measurement signal and transforming it into a second predictive process parameter signal that is related to said first process parameter measurement signal by the relationship $$PP_2 = \frac{k_{42}S}{(1 + d_1S)\ldots(1 + d_nS)} \cdot MP$$

wherein
  MP is said first process parameter measurement signal,
  $PP_2$ is said second predictive process parameter signal,
  S is the Laplace transform symbol $(d/dt)$,
  $k_{42}$ is a constant not equal to 0,
  $d_1, \ldots d_n$ are constants not equal to 0,
  n is an integer of at least 2,
c. second signal combining means for accepting said second intermediate control signal and said second predictive process parameter signal and generating in response thereto a second process variable signal being the weighted sum or difference of the second intermediate control signal and the second predictive process parameter signal,
d. switching means comprising at least two inputs and one output for accepting said output signal from said second controlling means at the first of these two inputs and for accepting said second process variable signal from said third controller at the second of said input and delivering either the signal from the first input or the signal from the second input at the output thereof depending on the position of the switch.

7. An apparatus in accordance with claim 1 additionally comprising
  a. an ammonia synthesis reactor for converting hydrogen and nitrogen into ammonia,
  b. a hydrogen source,
  c. a nitrogen source,
  d. feed gas conduit means operatively connected to said hydrogen source and said nitrogen source for introducing hydrogen and nitrogen into said synthesis reactor,
  e. outlet conduit means for removing an ammonia, hydrogen and nitrogen comprising effluent from said synthesis reactor,
  f. separating means connected to said outlet conduit means for producing an ammonia product stream and a recycle stream comprising ammonia, nitrogen and hydrogen,
  g. recycle conduit means connected to said separator means for recycling said recycle stream from said separator into said synthesis reactor,
  h. first analyzing means for determining the ratio of hydrogen to nitrogen in the total quantity of gases introduced into the synthesis reactor, both via said feed gas conduit means and via said recycle conduit means and generating said first process parameter measuring signal representative of said ratio, and
  i. flow control means operatively connected to said nitrogen source and/or said hydrogen source as well as to said first signal combining means for control of the relative size of the stream from said hydrogen source and a stream from said nitrogen source responsive to said first process variable signal.

8. An apparatus in accordance with claim 4 additionally comprising
  a. an ammonia synthesis reactor for converting hydrogen and nitrogen into ammonia,
  b. a hydrogen source,
  c. a nitrogen source,
  d. a conduit means for fresh feed gas operatively connected to said hydrogen source and said nitrogen source for introducing hydrogen and nitrogen into said synthesis reactor,
  e. outlet conduit means for removing an ammonia, hydrogen, nitrogen comprising effluent from said ammonia synthesis reactor,
  f. separating means operatively connected to said outlet conduit means for producing an ammonia product stream and a recycle stream comprising ammonia, nitrogen and hydrogen,
  g. recycle conduit means connected to said separator means for recycling said recycle stream from said separator into said synthesis reactor,
  h. first analyzing means determining the ratio of the hydrogen to nitrogen introduced into said ammonia reactor both via said fresh feed gas conduit means and via said recycle conduit means and generating said first process parameter measurement signal representative of said ratio,
  i. second analyzing means determining the hydrogen to nitrogen ratio of the fresh feed gas at least a portion of which is fed into the ammonia synthesis reactor via said feed gas conduit means and generating said second process variable measurement signal, and
  j. flow control means operatively connected to said nitrogen source and/or said hydrogen source and to said second controller means, said flow controller manipulating the relative size of the flow from said nitrogen source and from said hydrogen source into said synthesis reactor responsive to said output signal of said second controller means.

9. An apparatus in accordance wth claim 8 further comprising
  a. third controller means for accepting said first process parameter measurement signal and a second process parameter setpoint signal and delivering in response thereto a second intermediate control signal,
  b. second transforming means for accepting said first process parameter measurement signal and transforming it into a second predictive process parameter signal that is related to said first process parameter measurement signal by the relationship $$PP_2 = \frac{k_{42}S}{(1 + d_1S)\ldots(1 + d_nS)} \cdot MP$$

wherein
  MP is said first process parameter measurement signal,
  $PP_2$ is said second predictive process parameter signal,
  S is the Laplace transform symbol $(d/dt)$,
  $k_{42}$ is a constant not equal to 0,
  $d_1, \ldots d_n$ are constants not equal to 0,
  n is an integer of at least 2,
c. second signal combining means for accepting said second intermediate control signal and said second predictive process parameter signal and generating in response thereto a second process variable signal being the weighted sum or difference of the second intermediate control signal and the second predictive process parameter signal, d. switching means having a first and a second input for accepting said output signal from said second controller at said first input and for accepting said second process variable signal from said third controller at said second input and providing the signal from either the first input or the second input at the output of said switching means, and e. said flow control means being operatively connected to said nitrogen source and/or said hydrogen source and to the output of said switching means for manipulating the relative quantity of gas flow from said nitrogen source and said hydrogen source responsive to the signal at the output of said switching means.

10. An apparatus in accordance with claim 8 additionally comprising
   a. a steam source,
   b. a source of methane-comprising gas as said hydrogen source,
   c. an air source as said nitrogen source,
   d. a primary converter operatively connected to the steam source and the source of methane-containing gas converting steam and a first portion of the methane to a hydrogen, methane and carbon monoxide comprising primary reformer effluent,
   e. a secondary reformer operatively connected to said primary reformer for accepting at least a portion of said primary reformer effluent and also operatively connected to said air source for accepting air and converting a second portion of the methane into hydrogen and generating a hydrogen, carbon monoxide, methane and nitrogen-comprising secondary reformer effluent.
   f. a shift converter operatively connected to said secondary reformer to accept at least a portion of said secondary reformer effluent and converting at least a portion of the carbon monoxide in said effluent into carbon dioxide,
   g. a carbon dioxide removal means operatively connected to said shift converter for removing carbon dioxide from the effluent from said shift converter and producing a gas stream,
   h. a methanator means operatively connected to said carbon dioxide removal means for removing carbon monoxide from said gas stream by converting it into methane, the output of said methanator being operatively connected to said fresh feed gas conduit means for introducing a hydrogen and nitrogen comprising gas into said ammonia synthesis reactor, and
   i. said second analyzing means being operatively connected to a conduit connecting said methanator and said ammonia synthesis reactor for analyzing the hydrogen to nitrogen ratio of the fresh feed gas.

11. An apparatus comprising
   a. a first controller for accepting a first process parameter measurement signal and a process parameter setpoint signal and delivering in response thereto an intermediate control signal,
   b. transforming means for accepting said first process parameter measurement signal and generating a first predictive process parameter signal responsive thereto, said transforming means comprising
   aa. lag means for accepting said first process parameter measurement signal and generating a lagged signal by applying a second or higher order lag to said process parameter measurement signal, and
   bb. derivative means for accepting said lagged signal and generating said first predictive process parameter signal by a first time derivative to said lagged signal, and
   c. first signal combining means for accepting said first intermediate control signal and said first predictive process parameter signal and delivering in response thereto a first process variable signal being the weighted sum or difference between the intermediate control signal and said predictive process parameter signal.

12. A method for generating a process variable signal, said method comprising
   a. generating a process parameter measurement signal representative of the value of a preselected process parameter;
   b. transforming said process measurement signal into a transformed signal that is characterized as essentially the first time derivative of the process parameter measurement signal having applied thereto a second or higher order lag,
   c. converting said process parameter measurement signal into an intermediate control signal related to the time integral over the difference between the process parameter measurement signal and a process parameter setpoint signal, and
   d. generating in response to said transform signal and said intermediate process control signal a process variable signal representative of the weighted sum or difference of said transformed signal and said intermediate control signal.

13. A method in accordance with claim 12 wherein said transformed signal is related to said process parameter measurement signal by the relationship:

$$PP_1 = \frac{k_{41}S}{(1 + c_1S)(1 + c_2S)\ldots(1 + c_nS)} \cdot MP$$

wherein
  $MP$ is said process parameter measurement signal,
  $PP_1$ is said transformed signal,
  $k_{41}$ is a constant not equal to 0,
  $c_1, c_2 \ldots c_n$ are constants not equal to 0,
  $n$ is an integer of 2 or more,
  i S is the Laplace transform operator $(d/dt)$.

14. A method in accordance with claim 13 wherein said intermediate control signal is related to said process parameter measurement signal and a first setpoint signal by the relationship:

$$IC_1 = k_{11}(MP_1-SP_1) + k_{21}\int(MP_1-SP_1)dt + k_{31}(d/dt)(MP_1-SP_1)$$

wherein
  $IC_1$ is said intermediate control signal,
  $MP_1$ is said process parameter measurement signal,
  $SP_1$ is said first setpoint signal,
  $k_{11}, k_{21}, k_{31}$ are constant factors, $k_{11}$ and $k_{21}$ not being equal to 0.

15. A process for the production of ammonia comprising:
   a. introducing a fresh feed stream resulting from a first feed stream from a hydrogen source and a second feed stream from a nitrogen source into a reaction zone, said fresh feed stream being a portion of a total feed stream being introduced into said reaction zone, b. reacting said total feed stream in said reaction zone to convert hydrogen and nitrogen to ammonia and to generate a hydrogen, nitrogen and ammonia-comprising reaction effluent, c. separating an ammonia product stream from said reaction effluent as the product of the process, d. recycling a portion of said reaction effluent comprising hydrogen, nitrogen and ammonia as a recycle stream to said reaction zone, said recycle stream being another portion of said total feed stream, e. measuring the composition of said total feed stream and generating a first process parameter measurement signal representative of the hydrogen to nitrogen ratio of said feed stream, f. generating in response to first process parameter measurement signal and a process parameter setpoint signal a first intermediate control signal related to the deviation of said first process parameter measurement singal from said process parameter setpoint signal, g. generating a first transformed signal from said first process parameter measurement signal which is related thereto by the relationship:

$$PP_1 = \frac{k_{41}S}{(1 + c_1S)(1 + c_2S) \ldots (1 + c_nS)} \cdot MP_1$$

wherein
$MP_1$ is said first process parameter measurement signal,
$PP_1$ is said transformed signal,
$S$ is the Laplace transform operator $(d/dt)$,
$k_{41}$ is a constant not equal to 0,
$c_1, c_2, \ldots c_n$ are constants not equal to 0,
$n$ is an integer of at least 2, h. combining said first intermediate control signal and said first transformed signal to generate a first process variable signal constituting the weighted sum or difference of the first intermediate control signal and the transformed signal.

i. controlling the relative size of said first feed stream from said hydrogen source and said second feed stream from said nitrogen source in response to said first process variable signal.

16. A process in accordance with claim 15 wherein said first intermediate control signal is related to the time integral of the difference between said first process parameter measurement signal and said process parameter setpoint signal.

17. A process in accordance with claim 15 wherein said first intermediate control signal is related to said first process parameter measurement signal and said first process parameter setpoint signal by the equation $$IC_1 = k_{11}(MP_1 - SP_1) + k_{21}\int(MP_1 - SP_1)dt + k_{31}(d/dt)(MP_1 - SP_1)$$

wherein
$IC_1$ is said first intermediate control signal,
$MP_1$ is said first process parameter measurement signal,
$SP_1$ is said first process parameter setpoint signal,
$k_{11}, k_{21}$ and $k_{31}$ are constants, $k_{11}$ and $k_{21}$ not being equal to 0.

18. A process in accordance with claim 15 comprising
a. generating an output control signal in response to said first process variable signal and a second process parameter measurement signal which output control signal is related to the difference between said first process variable signal and said second process parameter measurement signal,
b. controlling said relative sizes of first and second feedstream responsive to said output control signal.

19. A process in accordance with claim 18 wherein output control signal is related to said first process variable signal and said second process parameter measurement signal by the relationship:

$$OS = k_{12}(PV_1 - MS) + k_{22}\int(PV_1 - MS)dt + k_{32}(d/dt)(PV_1 - MS)$$

wherein
$OS$ is said output control signal,
$PV_1$ is said first process variable signal,
$MS$ is said second process parameter measurement signal, $k_{12}, k_{22}$ and $k_{32}$ are constants, $k_{12}$ and $k_{22}$ not being equal to 0.

20. A process in accordance with claim 18 comprising
a. generating a second intermediate control signal from said first process parameter measurement signal and a second process parameter setpoint signal which is related to the difference between the first process parameter measurement signal and said second process parameter setpoint signal,
b. generating a second transformed signal from said first process parameter measurement signal that is related thereto by the equation:

$$PP_2 = \frac{k_{42}S}{(1 + d_1S)(1 + d_2S) \ldots (1 + d_nS)} \cdot MP$$

wherein
$PP_2$ is said second transformed signal,
$MP$ is said first process parameter measurement signal,
$S$ is said Laplace transform operator $(d/dt)$,
$k_{42}$ is a constant not equal to 0,
$d_1, d_2, \ldots d_n$ are constants not equal to 0,
$n$ is an integer of at least 2, c. combining said second intermediate control signal and said second transformed signal to generate a second process variable signal being the weighted sum or difference of said second intermediate control signal and second transformed signal, d. controlling the relative size of said first feed stream from said hydrogen source and second feed stream from said nitrogen source responsive to one signal from the group composed of said second process variable signal and said output control signal.

21. A process in accordance with claim 19 wherein
a. the composition of said fresh feed stream is determined and a hydrogen to nitrogen mole flow ratio signal representative of the hydrogen to nitrogen mole flow ratio in the fresh feed stream is generated responsive thereto,
b. wherein from said hydrogen to nitrogen mole flow ratio signal said second process parameter measurement signal is generated,
c. wherein said output control signal is representative of the desired flow ratio of said second feed stream from said nitrogen source to said first feed stream from said hydrogen source,
d. wherein a gas flow signal is generated representative of the gas flow in the first feed stream from said hydrogen source, e. wherein said output control signal is multiplied with said gas flow signal to generate a second feed stream control signal, and
f. wherein the flow of said second feed stream from said nitrogen source is controlled responsive to said second flow control signal.

22. A process in accordance with claim 21 wherein said hydrogen to nitrogen mole flow ratio signal is said second process parameter measurement signal.

23. A process for the production of ammonia comprising
   a. introducing a fresh feed stream resulting from a first feed stream from a hydrogen source and a second feed stream from a nitrogen source into a reaction zone, said fresh feed stream being a portion of a total feed stream being introduced into said reaction zone,
   b. reactng said total feed stream in said reaction zone to convert hydrogen and nitrogen to ammonia and to generate a hydrogen, nitrogen and ammonia-comprising reaction effluent,
   c. separating an ammonia product stream from said reaction effluent as the product of the process,
   d. recycling a portion of said reaction effluent comprising hydrogen, nitrogen and ammonia as a recycle stream to said reaction zone, said recycle stream being another portion of said total feed stream,
   e. measuring the composition of said total feed stream and generating a first process parameter measurement signal representative of the hydrogen to nitrogen ratio of said feed stream,
   f. generating in response to said first process parameter measurement signal and a process parameter setpoint signal a first intermediate control signal related to the deviation of said first process parameter measurement signal from said process parameter setpoint signal,
   g. generating a first transformed signal from said first process parameter measurement signal characterized as the first time derivative of said first process parameter measurement signal having applied thereto a second or higher order lag,
   h. combining said first intermediate control signal and said first transformed signal to generate a first process variable signal constituting the weighted sum or difference of the first intermediate control signal and the transformed signal, and
   i. controlling the relative size of said first feed stream from said hydrogen source and said second feed stream from said nitrogen source in response to said first process variable signal.

* * * * *

UNITED STATES PATENT AND TRADEMARK OFFICE
CERTIFICATE OF CORRECTION

PATENT NO. : 4,094,959

DATED : June 13, 1978

INVENTOR(S) : Donald H. Ball, Robert W. Rutledge, James D. Voelkers

It is certified that error appears in the above-identified patent and that said Letters Patent are hereby corrected as shown below:

Column 22, line 47, before "S", "i" should be deleted; Column 23, line 15, after "to" insert --- said ---; line 39, after "signal" delete "." and insert --- , ---.

Signed and Sealed this

Sixth Day of February 1979

[SEAL]

Attest:

RUTH C. MASON
Attesting Officer

DONALD W. BANNER
Commissioner of Patents and Trademarks